UNITED STATES PATENT OFFICE.

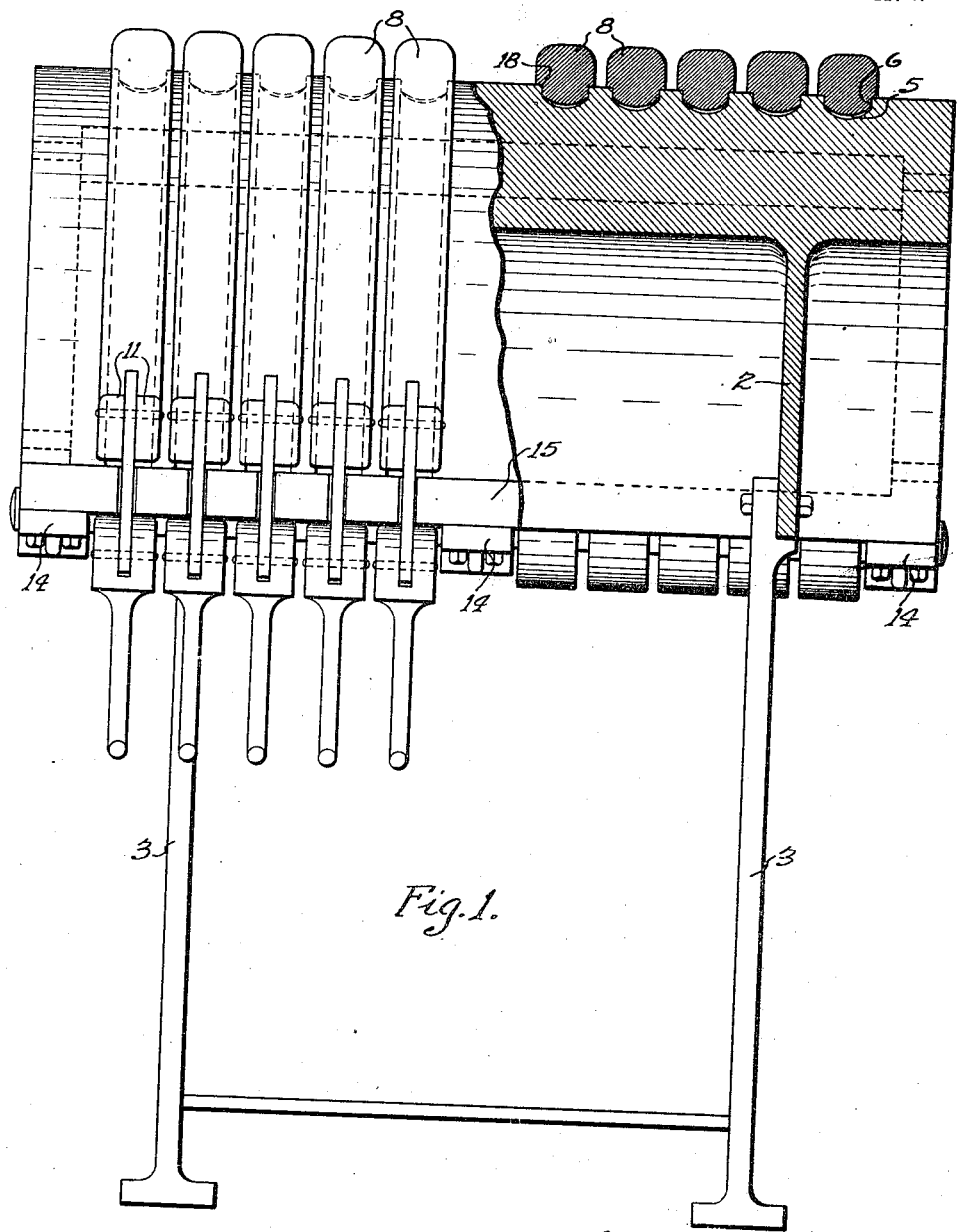

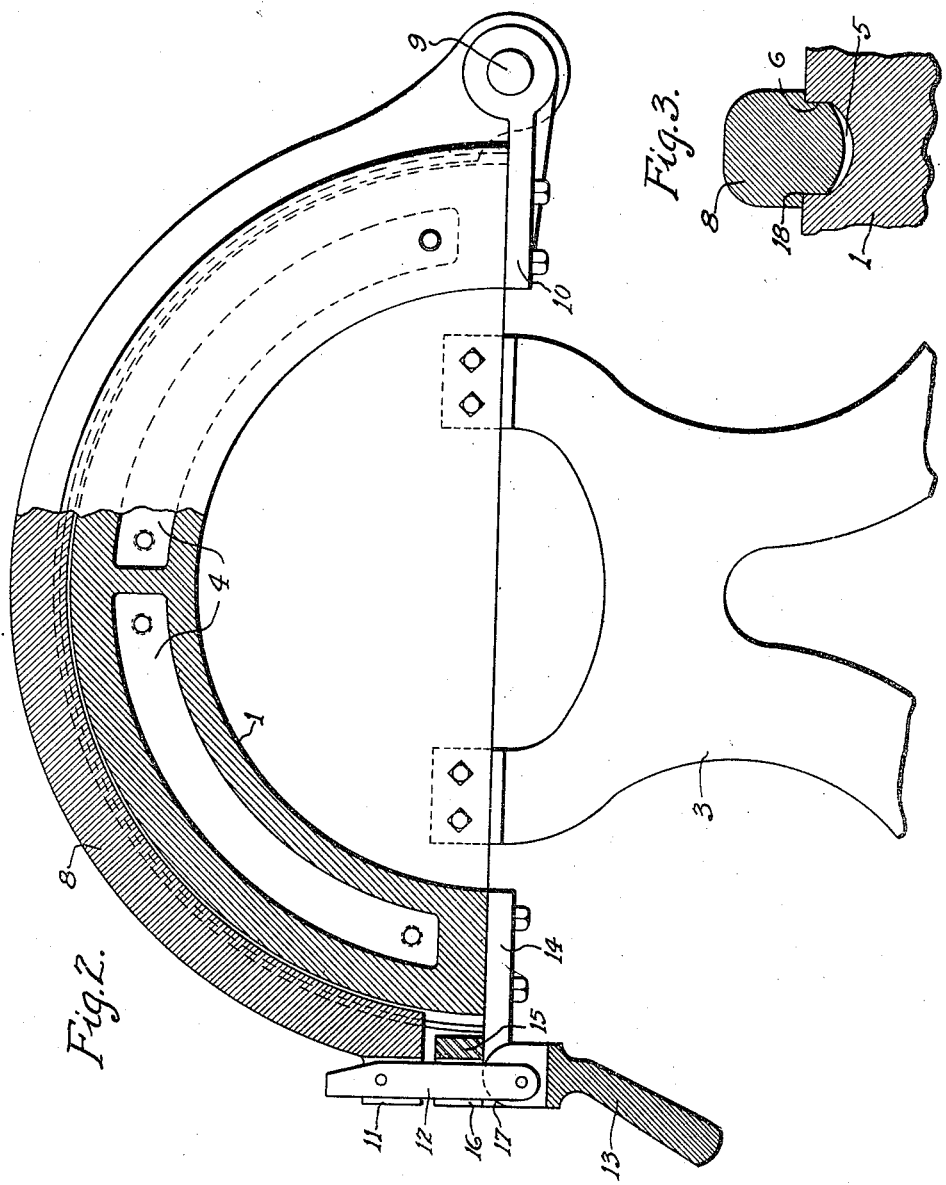

THOMAS C. MARSHALL, OF AKRON, OHIO, ASSIGNOR TO KELLY-SPRINGFIELD TIRE COMPANY, OF JERSEY CITY, NEW JERSEY, A CORPORATION OF NEW JERSEY.

VULCANIZER.

1,179,738.  Specification of Letters Patent.  Patented Apr. 18, 1916.

Application filed March 29, 1915. Serial No. 17,827.

*To all whom it may concern:*

Be it known that I, THOMAS C. MARSHALL, a citizen of the United States, residing at Akron, in the county of Summit and State of Ohio, have invented certain new and useful Improvements in Vulcanizers, of which the following is a specification.

This invention relates to improvements in vulcanizers particularly adapted for vulcanizing the flaps of pneumatic tires. Heretofore it has been common to vulcanize these flaps in straight vulcanizers, and, in order that the flaps might conform more readily to the contour of the tire casing, it has also been usual to employ bias fabric in the flaps, for, it will be understood, that if a straight fabric was employed in a flap cured in a straight mold or vulcanizer, in applying the flap it would be necessary to stretch the outer edges or buckle the center.

The object of this invention is to provide a vulcanizer for the curing of these flaps so constructed that flaps employing straight fabric may be vulcanized therein in such a way that the flaps will properly conform to the contour or circle of the tire casings, thereby decreasing the expense of cutting fabric on the bias and splicing it together for use in flaps cured in the straight vulcanizer.

In the accompanying drawings Figure 1 is a front view of a vulcanizer embodying my improvements, a portion thereof being broken away and shown in section. Fig. 2 is an end view of the same, with a portion thereof also broken away and shown in section. Fig. 3 is an enlarged detailed section of a portion of the main body and one of the bars, forming the molding chamber.

Like parts are indicated by similar characters of reference in the views.

In the said drawings, 1 represents the main body of the vulcanizer, formed on the arc of a circle. This main body 1 has two interior webs 2, which are bolted to a supporting stand 3. The body 1 is also provided with steam chambers 4, preferably two in number, and also has a series of grooves or recesses 5, to form coreless molding spaces the upper portion of each of which is formed with straight sides 6 and the lower portion of which is formed curved in cross-section as indicated in detail in Fig. 3.

8 represents a series of circular bars or segments, one for each groove 5, the rear ends of which are pivoted to a rod 9, supported in brackets 10, bolted to the rear under side of the main body 1. The forward end of each one of these bars is provided with a pair of ears 11 between which is pivoted the end of a link 12, the opposite end of the link having pivoted thereto the bifurcated end of a clamping lever 13. Secured to brackets 14, bolted to the main body 1, is a longitudinally extending bar 15, provided with a series of vertically arranged slots 16 which register with the links 12. The upper bifurcated end of each lever 13, is formed with a rounded face, 17, for the purpose of engaging the under side of the bar 15 with a cam action to clamp the bars 8 in position.

Each of the bars 8, has its inner portion reduced so as to form shoulders 18 which engage the upper surface of the main body 1, to form stops. The sides of each bar 8 immediately below the shoulders 18 are formed straight to register with the straight portions, 6, of the grooves 5, and the inner periphery of each bar from these straight sides is formed on the arc of a circle. The arc of the circle forming the bottom of the groove 5, is of smaller radius than that of the inner periphery of the bar 8 so that the molding space will be widest at the center of the groove and gradually taper toward the sides. This provides for giving to the flap the proper curvature in transverse direction. It is to be understood that these flaps are built up by fabric of several different widths which have been coated or frictioned with rubber and same are preferably made a little thicker than the space or groove 5 so that when the bar 8 is drawn firmly into place the surplus rubber is caused to flow from the heavier to the lighter part of the flap and in this way the groove or space 5 is completely and uniformly filled and it would therefore appear that the bar 8 will give the desired shape to the flap, making it of crescent shape to conform to the shape of the groove. The heat from the steam cavity 4 will radiate through the contact points between the bar 8 and the body 1 to heat the bar 8 and the flap will retain its crescent shape after vulcanization.

By the construction described it will be seen that a flap may be formed which will conform to the circular shape of the tire casing thus obviating the necessity of constructing the flap with bias fabric, thereby reducing the expense, as, with a flap so formed, it is possible to use the less expensive straight fabric.

Having thus described my invention I claim:

1. In a vulcanizer, a main body having a heating chamber, said main body being formed upon the arc of a circle, a series of circular members pivotally connected at one side of said main body, said main body having its periphery provided with a series of grooves, said circular members being fitted to said grooves so as to provide molding spaces, and means for clamping the free ends of said circular members to the opposite side of said main body.

2. In a vulcanizer, a main body formed on the arc of a circle, said main body being provided with a heating chamber and a peripheral groove, a circular member pivotally connected to one side of said main body together with means for clamping the same to the opposite side of said main body, and shoulders formed on the sides of said circular member to engage the periphery of said main body, the inner portion of said circular member being fitted to said groove, the bottom of said groove and the inner periphery of said circular member being transversely formed on the arcs of circles, of different radius.

3. In a vulcanizer, a main body formed with a receiving groove having a curved shaped bottom portion, a forming member of semi-circular form hinged at one side, means for clamping same at the opposite side, the said forming member having a curved shaped forming surface and substantially flat side projecting surfaces, the receiving groove having similar flat side surfaces, the forming member and the main body being so arranged that the flat surfaces of the forming member will contact against the flat surfaces of the receiving member and at the innermost position of the forming member an open space will be formed between the bottoms of the two members having its widest part at substantially the center thereof and ending at the point where the sides of the two members contact, substantially as specified.

In testimony whereof, I have hereunto set my hand this 19th day of March, 1915.

THOMAS C. MARSHALL.

Witnesses:
M. D. TENNEY,
W. F. VOGES.